Patented Sept. 27, 1938

2,131,197

UNITED STATES PATENT OFFICE 2,131,197

PRODUCTION OF CONVERSION PRODUCTS OF ACETYLENE

Robert Stadler and Albert Auerhahn, Heidelberg, Germany, assignors to I. G. Farbenindustrie Aktiengesellschaft, Frankfort - on - the - Main, Germany No Drawing. Application November 8, 1935, Serial No. 48,871. In Germany November 14, 1934

4 Claims. (Cl. 260—678)

The present invention relates to the production of conversion products of acetylene.

It has already been proposed to prepare valuable conversion products of acetylene by leading acetylene at elevated temperature through acid cuprous salt solutions. When these solutions are cooled, however, the salts contained therein separate in the form of firmly agglomerating masses whereby stoppages within the apparatus frequently occur which may lead to troublesome disturbances in operation.

We have now found that the said drawback can be readily obviated by adding to the cuprous salt solution dispersion stabilizers. On account of the addition of these stabilizers, the salts separating out are deposited in a finely divided state and do not agglomerate, consequently, stoppages within the apparatus do not occur.

By the term dispersion stabilizers are meant substances which keep in their disperse distribution bodies which have separated from solutions. Suitable dispersion stabilizers are for example vegetable mucilages, water-soluble kinds of gum, substances having gelatinizing power, such as agar-agar, pectins, dispersing agents, such as true aliphatic sulphonic acids of high molecular weight, in particular condensation products from fatty acids and hydroxyalkyl or aminoalkyl sulphonic acids, sulphonic esters of alcohols of high molecular weight or hydroxyalkylamides, alkylated aromatic sulphonic acids, condensation products of ethylene oxide with organic compounds which contain one or more hydroxy, carboxylic or amino groups, condensation products from fatty acids or the like and albumen degradation products, such as lysalbic acid, protalbic acid, sulphite cellulose waste liquor or the phosphatides obtained in the purification of vegetable oils, as for example lecithine. The dispersion stabilizers may be added to the cuprous salt solutions as such or in admixture with other substances.

An important advantage of the process according to this invention consists in the fact that by the addition of the said substances considerably higher yields of conversion products of acetylene are obtained than by the processes already known.

The following examples will further illustrate how the present invention may be carried out in practice but the invention is not restricted to these examples.

*Example 1*

30 litres of acetylene are led each hour through a mixture, heated to about 80° C. of 500 grams of cuprous chloride, 200 grams of ammonium chloride, 20 grams of copper powder, 500 grams of water and 2 grams of a condensation product derived from stearic acid and hydroxyethane sulphonic acid. There are obtained per hour 13 grams of a reaction product which consists to the extent of 80 per cent of mono-vinylacetylene. Under the same conditions but without adding the said condensation product only 10 grams of a reaction product are obtained and hard conglomerated masses of crystals are separated off so that a continuous working is impossible.

*Example 2*

30 litres of acetylene are led per hour through a mixture, heated to 90° C., of 500 grams of cuprous chloride, 200 grams of ammonium chloride, 20 grams of copper powder, 500 grams of water and 2 grams of the sodium salt of a butylated naphthalene sulphonic acid. There are obtained per hour 13 grams of a reaction product consisting for the most part of monovinylacetylene. Under the same conditions but without adding the said sulphonic acid only 10 grams of a reaction product are formed and the apparatus employed is frequently stopped by hard conglomerated masses of crystals which have separated.

*Example 3*

30 litres of acetylene are led per hour through a mixture, heated to 97° C., consisting of 250 grams of cuprous chloride, 100 grams of ammonium chloride, 10 grams of copper powder, 250 grams of water and 0.5 gram of linseed mucilage. There are formed per hour 7 grams of a reaction product consisting to the extent of 85 per cent of monovinylacetylene. Under the same conditions but without the addition of linseed mucilage, only 5 grams of reaction product are obtained.

What we claim is:—

1. In producing conversion products from acetylene by treating the same with aqueous acid cuprous salt solutions the step which comprises performing the said conversion by means of an acid cuprous salt solution to which has been added a small amount of a dispersion stabilizer.

2. In a producing conversion products from acetylene by treating the same with aqueous acid cuprous salt solutions the step which comprises adding to the said aqueous cuprous salt solutions a small amount of a condensation product derived from stearic acid and hydroxyethane sulphonic acid as a dispersion stabilizer.

3. In producing conversion products from acetylene by treating the same with aqueous acid cuprous salt solutions the step which comprises adding to the said aqueous cuprous salt solutions a small amount of the sodium salt of a butylated naphthalene sulphonic acid as a dispersion stabilizer.

4. In producing conversion products from acetylene by treating the same with aqueous acid cuprous salt solutions the step which comprises adding to the said aqueous cuprous salt solutions a small amount of linseed mucilage as a dispersion stabilizer.

ROBERT STADLER.
ALBERT AUERHAHN.